(12) United States Patent
Tauchi (10) Patent No.: US 11,325,423 B2
(45) Date of Patent: May 10, 2022

(54) PNEUMATIC TIRE AND PNEUMATIC TIRE MANUFACTURING METHOD

(71) Applicant: The Yokohama Rubber Co., LTD., Tokyo (JP)

(72) Inventor: Risa Tauchi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 614 days.

(21) Appl. No.: 16/073,684

(22) PCT Filed: Jan. 26, 2017

(86) PCT No.: PCT/JP2017/002683
§ 371 (c)(1),
(2) Date: Jul. 27, 2018

(87) PCT Pub. No.: WO2017/131076
PCT Pub. Date: Aug. 3, 2017

(65) Prior Publication Data
US 2019/0047329 A1      Feb. 14, 2019

(30) Foreign Application Priority Data

Jan. 29, 2016  (JP) .............................. JP2016-016406

(51) Int. Cl.
*B29C 35/02*      (2006.01)
*B60C 9/18*       (2006.01)
(Continued)

(52) U.S. Cl.
CPC .......... *B60C 11/0309* (2013.01); *B29C 33/02* (2013.01); *B29C 35/02* (2013.01);
(Continued)

(58) Field of Classification Search
CPC ..... B60C 11/0309; B60C 11/13; B60C 11/06; B60C 11/0316; B60C 2011/0362; B60C 2011/0341; B60C 11/0311
See application file for complete search history.

(56) References Cited

U.S. PATENT DOCUMENTS

| | | | |
|---|---|---|---|
| 4,986,325 A * | 1/1991 | Matsumoto | ......... B60C 11/0302 |
| | | | 152/209.17 |
| 5,152,854 A | 10/1992 | Matsumoto | |
| 6,220,844 B1 | 4/2001 | Kusano | |
| 2001/0002603 A1 | 6/2001 | Ikeda | |

(Continued)

FOREIGN PATENT DOCUMENTS

| | | |
|---|---|---|
| EP | 0 876 889 | 11/1998 |
| JP | S63-025108 | 2/1988 |

(Continued)

OTHER PUBLICATIONS

International Search Report for International Application No. PCT/JP2017/002683 dated Apr. 4, 2017, 5 pages, Japan.

*Primary Examiner* — Alison L Hindenlang
*Assistant Examiner* — Debjani Roy
(74) *Attorney, Agent, or Firm* — Thorpe North & Western (57) ABSTRACT

A pneumatic tire includes a tread portion with shoulder lug grooves spaced apart in a circumferential direction, each extending outward in a tire lateral direction, opening to a ground contact end, and including a closed end inward in the tire lateral direction. In a region of each of the shoulder lug grooves from an end of a belt having a greatest width in a belt portion of the pneumatic tire to an inner side in the tire lateral direction, the shoulder lug groove has a groove width that decreases inward in the tire lateral direction, and includes a portion where a groove cross-sectional area is kept constant by a change in at least one of a groove wall angle or a groove depth of the shoulder lug groove, the (Continued)

portion being provided in the tire lateral direction across a length of at least 20% of half a tire development width.

17 Claims, 4 Drawing Sheets

(51) Int. Cl.
  *B60C 11/03* (2006.01)
  *B29C 33/02* (2006.01)
  *B29D 30/06* (2006.01)
  *B60C 11/13* (2006.01)

(52) U.S. Cl.
  CPC ............... *B29D 30/06* (2013.01); *B60C 9/18* (2013.01); *B60C 11/03* (2013.01); *B60C 11/0311* (2013.01); *B60C 11/0316* (2013.01); *B60C 11/13* (2013.01); *B60C 11/1315* (2013.01); *B60C 2011/0341* (2013.01); *B60C 2011/0362* (2013.01); *B60C 2011/0369* (2013.01)

(56) References Cited

U.S. PATENT DOCUMENTS

| 2009/0035404 A1 | 2/2009 | Hana et al. |
| 2013/0220499 A1 | 8/2013 | Sanae |

FOREIGN PATENT DOCUMENTS

| JP | S63-106114 | | 5/1988 |
|---|---|---|---|
| JP | H03193507 | * | 3/1991 |
| JP | H03-193507 | | 8/1991 |
| JP | H05-254311 | | 10/1993 |
| JP | H10-305713 | | 11/1998 |
| JP | H11-129706 | | 5/1999 |
| JP | 2001-163011 | | 6/2001 |
| JP | 2002-248908 | | 9/2002 |
| JP | 2004-210133 | | 7/2004 |
| JP | 2005-193525 | | 7/2005 |
| JP | 2008-173777 | | 7/2008 |
| JP | 2009-034933 | | 2/2009 |
| JP | 2009-126280 | | 6/2009 |
| JP | 2011-225084 | | 11/2011 |
| JP | 2013-173394 | | 9/2013 |
| JP | 2014-073736 | | 4/2014 |
| JP | 2015-063182 | | 4/2015 |

* cited by examiner

PNEUMATIC TIRE AND PNEUMATIC TIRE MANUFACTURING METHOD

TECHNICAL FIELD

The present technology relates to a pneumatic tire that includes a shoulder lug groove, and a method of manufacturing a pneumatic tire.

BACKGROUND ART

A tire for a construction vehicle or a tire for an industrial vehicle, owing to conditions of use, demands excellent durability for withstanding heavy loads as well as a long tire service life. Tire structural factors that cause deterioration in durability include disturbance in carcass cords near an end of a belt portion and fluctuation in an interval between the carcass cords (corrugation). When a tire is manufactured and lug grooves are formed as a tread pattern on the tire, the lug grooves are formed by protrusion portions of a vulcanization mold corresponding to the lug grooves. The protrusion portions extend inward in a tire lateral direction through a tread rubber of a tread portion in the tread portion of a product tire before vulcanization molding while pushing aside the tread rubber in a tire circumferential direction. As a result, the carcass cords in a carcass ply are pulled along with a flow of the tread rubber, causing disturbance and corrugation in the carcass cords near the end of the belt portion.

In contrast, there is a known method of manufacturing a heavy duty pneumatic radial tire capable of preventing corrugation of a belt end (Japanese Unexamined Patent Publication No. 2005-193525).

According to this method, a product tire is obtained by providing a plurality of sipes, each including components in the tire lateral direction, in the tire circumferential direction in a region where the lug grooves are provided in the green tire prior to vulcanization molding, and then vulcanizing and molding the green tire in a vulcanization mold.

According to the above method, the plurality of sipes, each including components in the tire lateral direction, are provided in the tire circumferential direction in the region where the lug grooves are provided in the green tire prior to vulcanization molding, and thus the sipes of the green tire expanded in diameter open during vulcanization molding, causing the protrusion portions of the vulcanization mold that form the lug grooves to readily bite into the sipes provided on an outer circumferential surface of the green tire. In this way, a force inward in a tire radial direction produced from the biting of the protrusion portions is dispersed in the circumferential direction to suppress movement of a belt layer end inward and outward in the tire radial direction, making it possible to suppress corrugation of the end of the belt layer.

However, the method described above is a method for suppressing corrugation of the belt layer end, but not for suppressing disturbance or corrugation of the ply cords, and the corrugation of the belt layer end is caused by movement inward and outward in the tire radial direction. Moreover, a process of providing sipes on the surface of an unvulcanized green tire is required, deteriorating production efficiency. On the other hand, a countermeasure that decreases disturbance and corrugation of the carcass cords near the end of the belt portion by decreasing a groove depth of the lug grooves provided to the tire and suppressing an amount of the tread rubber of the green tire pushed aside in the tire circumferential direction by the protrusion portions of the mold is also conceivable. Such a countermeasure, however, shortens the tire service life due to the groove depth of the lug grooves decreasing.

SUMMARY

The present technology provides a pneumatic tire capable of improving durability by suppressing disturbance and corrugation of carcass cords near an end of a belt portion while extending a tire service life, and a method of manufacturing a pneumatic tire.

One aspect of the present technology is a pneumatic tire that includes a belt portion, and a tread portion provided with a plurality of shoulder lug grooves spaced apart in a circumferential direction, the plurality of shoulder lug grooves each extending outward in a tire lateral direction, opening to a ground contact end, and including a closed end inward in the tire lateral direction. In a region of each of the plurality of shoulder lug grooves from an end of a belt having a greatest width in the belt portion to an inner side in the tire lateral direction, each of the plurality of shoulder lug grooves has a groove width that decreases inward in the tire lateral direction, and includes a portion where a groove cross-sectional area is kept constant by a change in at least one of a groove wall angle or a groove depth of each of the plurality of shoulder lug grooves, the portion being provided in the tire lateral direction across a length of at least 20% of half a tire development width.

The groove wall angle of the portion preferably changes within a range from 10 to 35 degrees.

A ratio of a minimum groove depth to a maximum groove depth in a region of the plurality of shoulder lug grooves from a position separated from a tire centerline of the pneumatic tire by one-fourth of the tire development width to the ground contact end is preferably 0.8 or greater.

At this time, the ratio is preferably from 0.85 to 0.95, and the groove wall angle in the portion preferably changes within a range from 15 to 25 degrees.

The shoulder lug groove preferably includes a groove bottom inclined surface inclined such that a groove depth of each of the plurality of shoulder lug grooves gradually decreases as approaching closer to the closed end. The groove bottom inclined surface preferably has, in a profile cross section of the pneumatic tire along a tire radial direction, an inclination angle with respect to a normal line of a surface of the tread portion ranging from 20 to 45 degrees, at the closed end.

The portion where the groove cross-sectional area is kept constant is preferably from a position separated from a tire centerline of the pneumatic tire by a distance L1 to a position separated from the tire centerline by a distance L2, L1 being a distance equivalent to from 40 to 60% of half of the tire development width, and L2 being a distance equivalent to from 70 to 90% of half of the tire development width.

The portion where the groove cross-sectional area is kept constant preferably has a length in the tire lateral direction of no greater than 35% of half of the tire development width.

Further, another aspect of the present technology is a method of manufacturing a pneumatic tire, the method including the steps of molding an unvulcanized green tire that includes a belt portion, and enclosing and heating the green tire in a mold. The mold includes a plurality of protrusion portions for forming shoulder lug grooves that extend in one direction such that a plurality of shoulder lug grooves, each extending outward in a tire lateral direction, opening to a ground contact end, and including a closed end inward in a tire lateral direction, are provided spaced apart in a tire circumferential direction in a tread portion of the pneumatic tire. In a region of each of the plurality of protrusion portions from an end of a belt having a greatest width in the belt portion of the green tire to an inner side in the tire lateral direction, each of the plurality of protrusion portions has a width that decreases inward in the tire lateral direction, and includes a portion where a cross-sectional area of each of the plurality of protrusion portions is kept constant by a change in at least one of a protrusion height or a wall inclination angle of a side wall of each of the plurality of protrusion portions corresponding to a groove wall of the shoulder lug groove, the portion being provided in the tire lateral direction across a length of at least 20% of half a tire development width.

The mold preferably includes two partial molds for forming a tread pattern in the tread portion of the green tire, each of the partial molds including the plurality of protrusion portions. Each of the plurality of protrusion portions is forced into the tread portion of the green tire from an outer side toward an inner side in the tire lateral direction when the mold encloses the green tire.

According to a pneumatic tire and a method of manufacturing a pneumatic tire described above, it is possible to improve durability by suppressing disturbance and corrugation of carcass cords near an end of a belt portion while extending a tire service life.

DETAILED DESCRIPTION

A pneumatic tire according to the present technology will be described below in detail.

Figure 1:
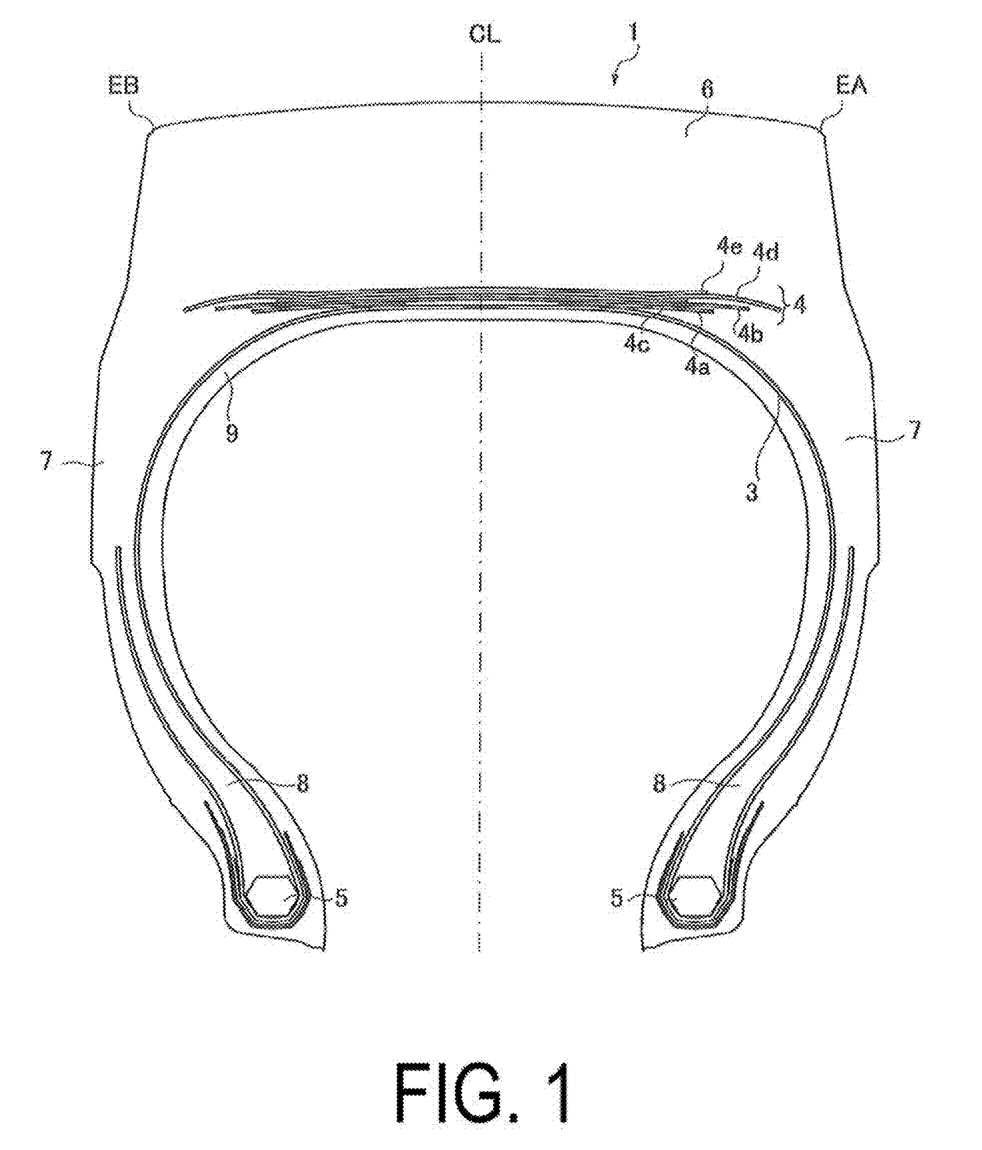
FIG. 1 is a diagram illustrating an example of a profile cross section of a pneumatic tire according to the present embodiment.

FIG. 1 is a diagram illustrating an example of a profile cross section of a pneumatic tire (hereinafter referred to as "tire") 1 according to the present embodiment that includes a tire rotation axis of the tire 1 and is sectioned along a plane in a tire radial direction. The tire 1 is a heavy duty pneumatic tire. In FIG. 1, illustration of the shoulder lug groove is omitted.

Heavy duty pneumatic tires in this specification include tires described in Section C of JATMA Year Book 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in section 4 or section 6 of TRA (Tire and Rim Association) Year Book 2013.

The directions and sides in the present specification are defined as follows.

"Tire lateral direction" is the direction parallel to the rotation axis of the pneumatic tire. "Outward in the tire lateral direction" is the direction in the tire lateral direction away from a tire centerline CL that represents the tire equatorial plane with respect to the position of comparison. "Inward in the tire lateral direction" is the direction in the tire lateral direction toward the tire centerline CL with respect to the position of comparison. "Tire circumferential direction" is the direction the pneumatic tire rotates with the rotation axis of the pneumatic tire as the center of rotation. "Tire radial direction" is the direction orthogonal to the rotation axis of the pneumatic tire. "Outward in the tire radial direction" is the direction away from the rotation axis in the tire radial direction with respect to the position of comparison. "Inward in the tire radial direction" is the direction toward the rotation axis in the tire radial direction with respect to the position of comparison.

Tire Structure

The tire 1 includes a carcass ply 3, a belt portion 4, and a pair of bead cores 5, and further includes a tread portion 6, side portions 7, bead fillers 8, an innerliner 9, and the like as rubber layers around these. The tread portion 6 includes tread rubber.

At least one layer of the carcass ply 3 is provided (one layer in FIG. 1), and is mounted between the pair of bead cores 5. This carcass ply 3 includes a plurality of carcass cords extending in the tire radial direction, and is folded back around the bead cores 5 from an inner side to an outer side in the tire lateral direction. Additionally, the bead fillers 8 are disposed outward of the bead cores 5 in the tire radial direction, and enveloped by a main body portion and the folded over portion of the carcass ply 3.

The belt portion 4 made up of a plurality of belts is provided outward of the carcass ply 3 in the tire radial direction, inward of the tread portion 6 in the tire radial direction.

The belt portion 4 includes five belts. The five belts include one strengthening belt 4a most inward in the tire radial direction, two cross belts 4b, 4c outward of the strengthening belt 4a in the tire radial direction, and protective belts 4d, 4e outward of the cross belt 4c in the tire radial direction.

The strengthening belt 4a has a hollow structure, and steel cords constituting the belt have a large inclination angle with respect to the tire circumferential direction compared to inclination angles of the cross belts 4b, 4c and the protective belts 4d, 4e. In this way, the strengthening belt 4a exhibits a function of increasing a belt rigidity in the tire lateral direction. The steel cords constituting the cross belts 4b, 4c are inclined to mutually different sides in the tire lateral direction with respect to the tire circumferential direction. As a result, the cross belts 4b, 4c exhibit a hoop effect with respect to the tire that tends to expand by internal pressure inflation.

The inclination angles of the steel cords of the protective belts 4d, 4e with respect to the tire circumferential direction are large compared to the inclination angles of the steel cords of the cross belts 4b, 4c with respect to the tire circumferential direction. A belt width of the protective belt 4d along the tire lateral direction is greater than any one of the belt widths of the protective belt 4e, the strengthening belt 4a, and the cross belts 4b, 4c.

The tire 1, while having the tire structure described above, is not limited thereto, and may have a known tire structure or a new tire structure.

Tread Pattern

Figure 2A:
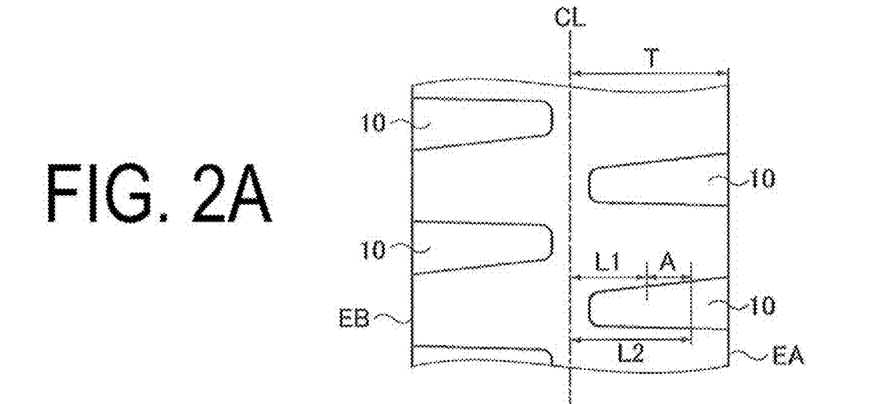
FIG. 2A is a diagram illustrating an example of a tread pattern of a tire of the present embodiment.

FIG. 2A is a diagram illustrating an example of a tread pattern of the tire 1. In the tread pattern of the tire 1, a plurality of shoulder lug grooves 10 are provided spaced apart in the tire circumferential direction, each extending outward in the tire lateral direction, opening to a ground contact end EA or EB, and having a closed end inward in the tire lateral direction. The shoulder lug grooves 10 each include a portion having a groove width that decreases from an outer side toward an inner side in the tire lateral direction. The shoulder lug grooves 10 are provided in half-tread regions on both sides in the tire lateral direction, with the tire centerline CL serving as a border. The position in the tire circumferential direction of the shoulder lug grooves 10 provided in one half-tread region is between the positions in the tire circumferential direction of the shoulder lug grooves 10 provided adjacent in the tire circumferential direction in the other half-tread region. The position in the tire lateral direction of the closed end of the shoulder lug groove 10 inward in the tire lateral direction is a position separated from the tire centerline CL by a distance from 5 to 35% of half a tire development width (a periphery length T from the tire centerline CL to the ground contact end EA or EB).

The groove shape of the shoulder lug groove 10 is set as follows. That is, in the region of the shoulder lug groove 10 from the end of the protective belt 4d, which is the belt having the greatest width of the belt portion 4, to the inner side in the tire lateral direction, the shoulder lug grove 10 has a groove width that decreases from the outer side toward the inner side in the tire lateral direction, and includes a portion where a groove cross-sectional area is kept constant by a change in at least one of a groove wall angle and a groove depth of the shoulder lug groove 10, the portion being provided in the tire lateral direction across a length (length in the tire lateral direction) of at least 20% of half the tire development width (periphery length T). For example, in a portion A from a position separated from the tire centerline CL by a distance L1 to a position separated from the tire centerline CL by a distance L2, the shoulder lug groove 10 has a groove width that decreases from the outer side toward the inner side in the tire lateral direction, and the groove cross-sectional area is kept constant by a change in at least one of the groove wall angle and the groove depth of the shoulder lug groove 10. Here, the distance L1 is preferably from 40 to 60% of the periphery length T, and the distance L2 is preferably from 70 to 90% of the periphery length T. Further, a maximum value of the length in the tire lateral direction of the portion where the groove cross-sectional area is kept constant is preferably no greater than 35% of half of the tire development width (periphery length T).

Figure 2B:
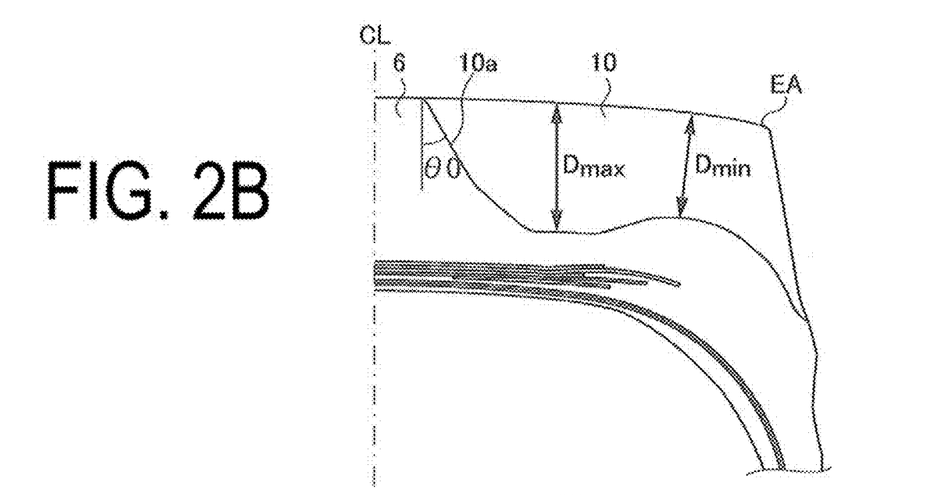
FIG. 2B is a diagram illustrating an example in which a groove depth of shoulder lug groove illustrated in FIG. 2A changes.
Figure 2C:
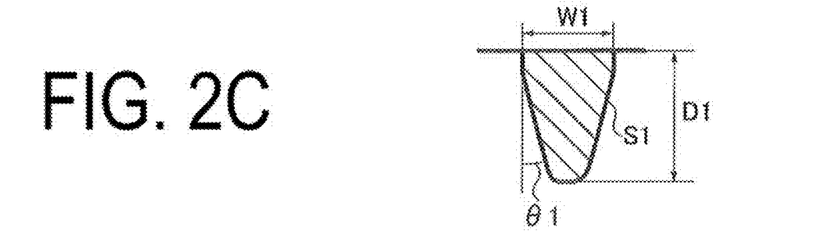
FIGS. 2C and 2D are diagrams illustrating examples in which a groove shape of the shoulder lug groove illustrated in FIG. 2A changes.
Figure 2D:
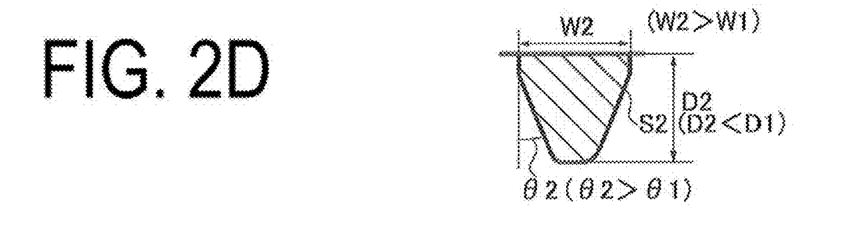

FIG. 2B is a diagram illustrating an example in which the groove depth of the shoulder lug groove 10 changes in the tire lateral direction. FIGS. 2C and 2D are diagrams illustrating examples in which the groove shape of the shoulder lug groove 10 changes.

As illustrated in FIG. 2B, in the region of the groove bottom inclined surface 10a outward in the tire lateral direction, excluding the groove bottom inclined surface 10a that gradually deepens from a closed portion inward in the tire lateral direction, or in a region of the shoulder lug groove 10 from a position separated from the tire centerline CL by 50% of half of the tire development width (periphery length T), that is, by one-fourth of the tire development width, to the ground contact end EA or EB, the groove depth of the shoulder lug groove 10 becomes a maximum groove depth Dmax, gradually decreases to a minimum groove depth Dmin, and subsequently increases once again until the ground contact end EA or EB is reached.

At this time, the groove shape of the shoulder lug groove 10 also changes. The groove shape illustrated in FIG. 2C is the groove shape in a position separated from the tire centerline CL by the distance L1, and the groove shape illustrated in FIG. 2D is the groove shape in a position separated from the tire centerline CL by the distance L2 (L2>L1). At this time, the groove wall angle of the groove shape illustrated in FIG. 2C is $\theta 1$, and the groove wall angle of the groove shape illustrated in FIG. 2D is $\theta 2$ ($\theta 2 > \theta 1$). The groove width changes from W1 to W2 (W2>W1), the groove wall angle changes from $\theta 1$ to $\theta 2$, and the groove depth also changes from D1 to D2 (D2<D1), thereby keeping the groove cross-sectional area constant. A constant groove cross-sectional area means that a value of the groove cross-sectional area at any position in the portion A described above is from 95 to 105%, preferably from 97 to 103%, with respect to an average groove cross-sectional area in the portion A. Groove cross-sectional areas S1, S2 of the groove shapes illustrated in FIGS. 2C and 2D are also within a range from 95 to 105% of the average groove cross-sectional area. The average groove cross-sectional area is a value obtained by dividing the groove volume of the portion A by the groove length of the portion A. In the portion A in which the groove cross-sectional area is constant, preferably the groove wall angle changes by two degrees or greater and the groove depth changes by 3 mm or greater.

The significance of providing the portion A where the groove cross-sectional area is kept constant in the shoulder lug groove 10 in this way is described below.

Figure 3:
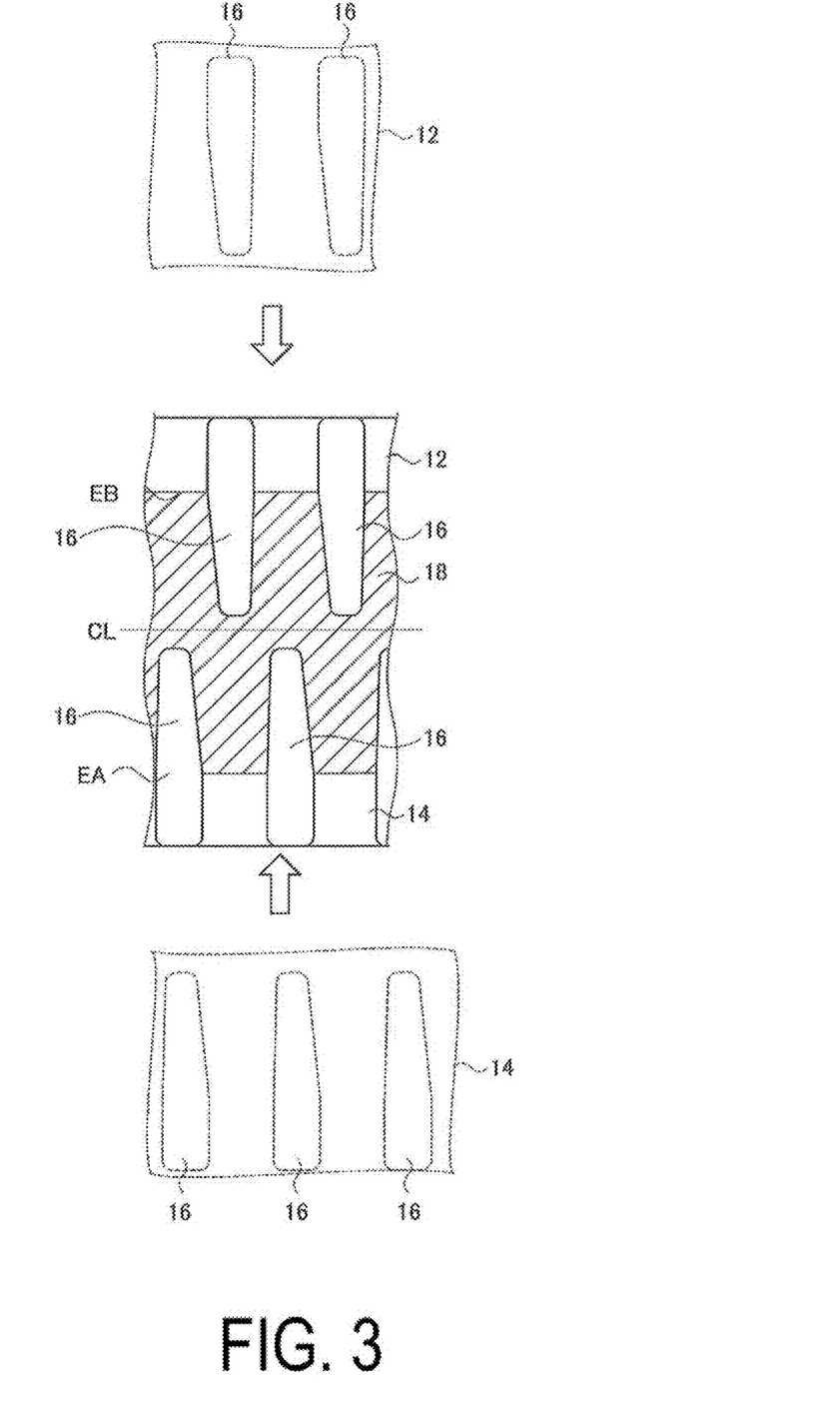
FIG. 3 is a diagram for describing a green tire and a mold during vulcanization in a manufacturing process of a tire of the present embodiment.

As illustrated in FIG. 3, when a green tire is vulcanized using a two-piece split mold including an upper mold 12 and a lower mold 14, the upper mold 12 and the lower mold 14 come close to each other so as to sandwich a green tire 18 from both sides (upper side and lower side in FIG. 3) in the tire lateral direction, enclosing the green tire 18 inside the mold for vulcanization. FIG. 3 is a diagram for describing the green tire 18 (hatched region) enclosed in a mold during vulcanization in a manufacturing process of a tire. At this time, protrusion portions 16 provided to the upper mold 12 and the lower mold 14 for forming the shoulder lug groove 10 push aside the tread rubber in the tire circumferential direction while biting into the tread portion of the green tire 18, thereby forming the shoulder lug grooves 10.

Figure 4A:
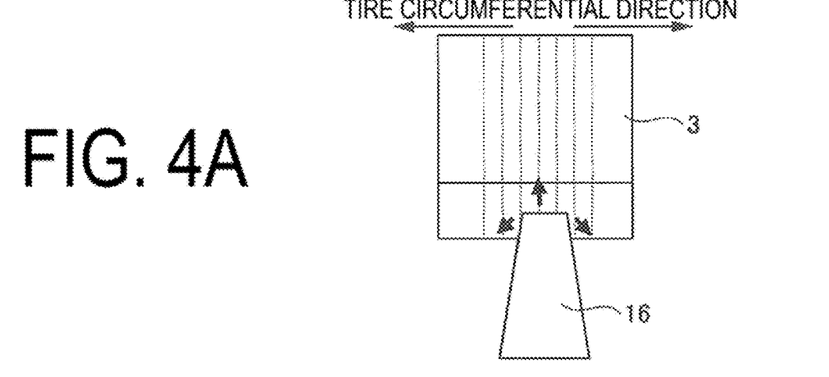
FIGS. 4A to 4C are diagrams for describing a movement of protrusion portions of a lower mold used for vulcanization in a manufacturing process of a tire.
Figure 4B:
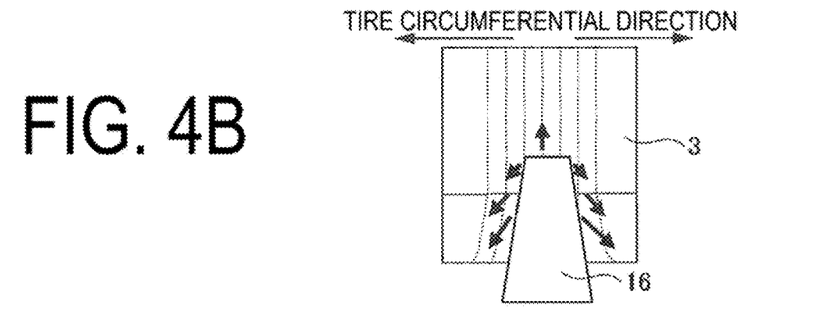
Figure 4C:
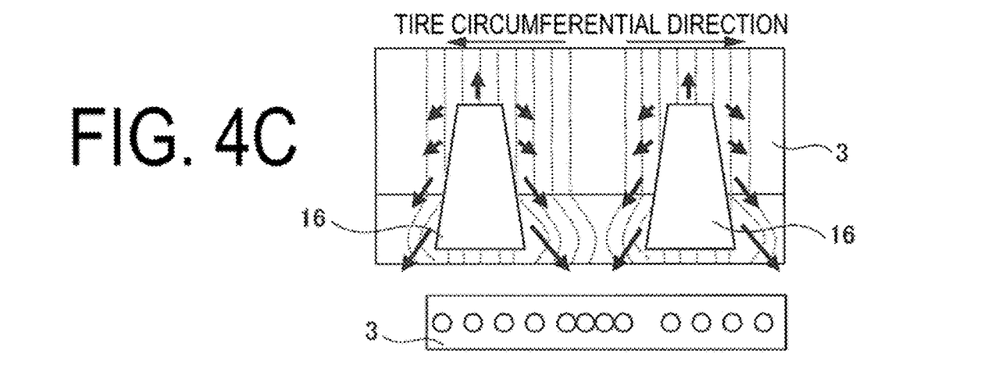
Figure 4D:
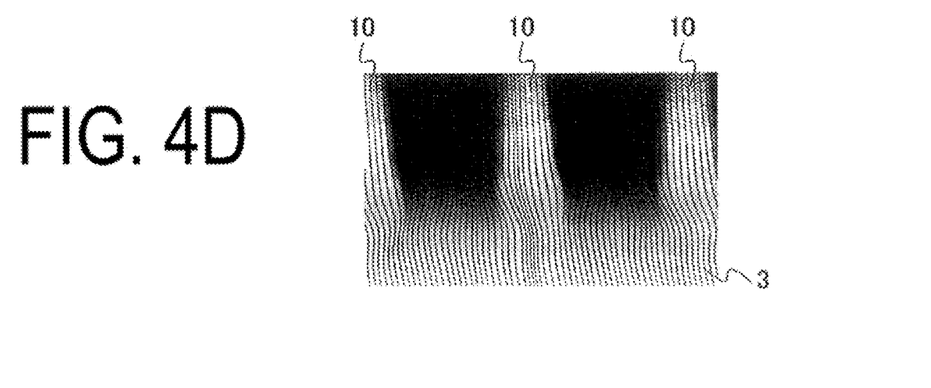
FIG. 4D is a diagram showing an X-ray image of disturbance and corrugation of carcass cords near an end of a belt portion in a tire in the related art.

FIGS. 4A to 4C are diagrams for explaining the movement of the protrusion portions 16 of the lower mold 14 that push aside the tread rubber while biting into the tread portion 6 of the green tire 18. The protrusion portions 16 bite into the tread portion 6, causing the tread rubber to be pushed aside and flow in the tire circumferential direction. As a result, the tread rubber flows between the protrusion portions 16 adjacent to each other in the tire circumferential direction and, pulled along with this flow, the carcass cords swell in the region of the carcass ply 3 that comes into contact with the tread rubber and not into contact with the belt portion 4, causing disturbance and corrugation of the carcass cords to occur near the end of the belt portion, as illustrated in FIGS. 4A to 4C. FIG. 4D is a diagram showing an X-ray image of the disturbance and corrugation of the carcass cords near the end of the belt portion in the carcass ply 3 of a tire in the related art. As illustrated in FIG. 4D, disturbance and corrugation that can be coarse or fine occurs in the carcass cords.

In the present embodiment, to suppress such disturbance and corrugation in the carcass cords in the carcass ply 3, in the region of the shoulder lug groove 10 from the end of the protective belt 4d, which is the belt having the greatest width in the belt portion 4, to the inner side in the tire lateral direction, the shoulder lug groove 10 has a groove width that decreases inward in the tire lateral direction, and includes the portion A where the groove cross-sectional area is kept constant by a change in at least one of the groove wall angle and the groove depth of the shoulder lug groove 10, the portion A being provided in the tire lateral direction across at least 20% of half the tire development width (periphery length T). In the present embodiment, when the minimum groove depth Dmin is 80 mm or greater, it is possible to more effectively suppress disturbance and corrugation of the carcass cords.

At this time, the groove wall angle of the portion A preferably changes within a range from 10 to 35 degrees. Such a range makes it possible to suppress disturbance and corrugation of the carcass cords near the end of the belt portion 4 and improve durability. When the groove wall angle is less than 10 degrees, a resistance when the protrusion portions 16 of the upper mold 12 and the lower mold 14 bite into the tread portion 6 of the green tire 18 increases, making the flow of the tread rubber in the tire circumferential direction intense, and increasing the disturbance and corrugation of the carcass cords near the end of the belt portion 4 in the carcass ply 3. On the other hand, when the groove wall angle exceeds 35 degrees, leading edges of the protrusion portions 16 of the upper mold 12 and the lower mold 14 sharpen, causing the protrusion portions 16 of the upper mold 12 and the lower mold 14 to more readily bite into the tread portion 6 of the green tire 18. While this makes it possible to suppress disturbance and corrugation of the carcass cords near the end of the belt portion 4 in the carcass ply 3, cracks are more readily generated in the groove bottom of the shoulder lug groove 10. Note that the groove wall angles of the groove walls on both sides of the shoulder lug groove 10 do not need to be the same.

Further, in the region of the shoulder lug groove 10 from a position separated from the tire centerline CL by 50% of the tire development width (the periphery length T from the tire centerline CL to the ground contact end EA or the ground contact end EB), that is, by one-fourth of the tire development width, to the ground contact end EA or EB, the ratio of the minimum groove depth Dmin to the maximum groove depth Dmax of the shoulder lug groove 10 is preferably 0.8 or greater from the viewpoint of suppressing disturbance and corrugation of the carcass cords near the end of the belt portion 4 and improving durability without shortening the service life of the tire. At this time, the range of the minimum groove depth Dmin is preferably from 80 to 100 mm.

Particularly, when the groove wall angle and the groove depth are changed, pa ratio of the minimum groove depth Dmin to the maximum groove depth Dmax is preferably from 0.85 to 0.95, and the groove wall angle preferably changes within the range from 15 to 25 degrees in the portion A, for practical use. Such a range makes it possible to suppress disturbance and corrugation of the carcass cords near the end of the belt portion 4 in the carcass ply 3 and improve durability without shortening the service life of the tire.

Further, as illustrated in FIG. 2B, the shoulder lug groove 10 preferably includes the groove bottom inclined surface 10a inclined so that the groove depth gradually decreases as approaching closer to the closed end of the shoulder lug groove 10 inward in the tire lateral direction and, in a tire profile cross section, an inclination angle θ0 of the groove bottom inclined surface 10a with respect to the normal line of the surface of the tread portion is preferably 20 to 45 degrees at the closed end, from the viewpoint of decreasing the resistance when the protrusion portions 16 of the upper mold 12 and the lower mold 14 bite into the tread portion of the green tire 18, and suppressing the flow of tread rubber.

Such a pneumatic tire is manufactured by the method of manufacturing below.

First, the unvulcanized green tire 18 including the belt portion 4 is molded. Next, this green tire 18, as illustrated in FIG. 3, is enclosed and heated in a mold (vulcanized). The mold includes the plurality of protrusion portions 16 for forming shoulder lug grooves corresponding to the plurality of shoulder lug grooves 10 that are provided in the tread portion 6 of the tire to be manufactured and extending in one direction. These shoulder lug grooves 10 are provided spaced apart in the tire circumferential direction, each extending outward in the tire lateral direction, opening to the ground contact end EA or EB, and closing at an end inward in the tire lateral direction. In a region of each of the protrusion portions 16 inward in the tire lateral direction from the end of the belt having the greatest width in the belt portion 4 of the green tire 18, each of such protrusion portions 16 corresponding to the shoulder lug grooves 10 has a width (length in a direction orthogonal to the extending direction of the protrusion portion 16) that decreases inward in the tire lateral direction, and includes a portion where the cross-sectional area of the protrusion portion 16 is kept constant by a change in at least one of a protrusion height of the protrusion portion 16 and a wall inclination angle of a side wall of the protrusion portion 16 corresponding to the groove wall of the shoulder lug groove 10, the portion being provided in the tire lateral direction across a length of at least 20% of half the tire development width. Here, a constant cross-sectional area means that the value of the cross-sectional area at any position in the portion of the protrusion portion 16 corresponding to the portion A is from 95 to 105%, preferably from 97 to 103%, with respect to an average cross-sectional area of the portion of the protrusion portion 16 corresponding to the portion A described above.

Further, the mold includes the upper mold 12 and the lower mold 14, which are two partial molds for forming the tread pattern in the tread portion of the green tire 18. That is, the mold is a two-piece split mold. The upper mold 12 and the lower mold 14 each include the protrusion portions 16. When the upper mold 12 and the lower mold 14, as illustrated in FIG. 3, enclose the green tire 18, each of the protrusion portions 16 is configured to be forced into the tread portion of the green tire 18 from the outer side toward the inner side in the tire lateral direction, forming the shoulder lug groove 10. When such a two-piece split mold is used, it is possible to significantly exhibit the effect of suppressing disturbance and corrugation of the carcass cords near the end of the belt portion 4 of the carcass ply 3.

While, in the present embodiment, in the shoulder lug groove 10 having a groove width that decreases inward in the tire lateral direction, the groove depth and the groove wall angle of the shoulder lug groove 10 are changed to keep the groove cross-sectional area of the portion A constant, only the groove depth of the shoulder lug groove 10 may be changed to keep the groove cross-sectional area of the portion A constant, or only the groove wall angle of the shoulder lug groove 10 may be changed to keep the groove cross-sectional area of the portion A constant.

Conventional Example, Comparative Example, Examples

To survey the effects of the pneumatic tire of the present embodiment, the tire illustrated in FIG. 1 was manufactured while making various changes to the cross-sectional shape of the shoulder lug grooves, and the durability and service life of the tire were investigated. The size of each manufactured tire was 26.5R25L-5. A rim having a rim size of 25×22.00-3.0 (TRA-specified rim) was mounted onto each tire. Each tire was then filled to an air pressure of 500 kPa (TRA-specified air pressure).

Assessment of the durability and the service life of the tire was performed by running the pneumatic tire on an off-road surface at a speed of 5 km/hr for 3000 hours using a loader having a weight of 23 tons, and subsequently disassembling the tire and measuring the expansion of cracks in the shoulder portion. The reciprocal of the measurement result was expressed as an index value relative to the reciprocal of the measurement result of the Conventional Example (defined as 100). A larger index value indicates greater durability. Further, the groove depth of the shoulder lug groove of the tire after the run was measured and, on the basis of the measurement results, the time until the shoulder lug groove no longer function as a lug groove was assessed as the tire service life. The tire service life was expressed as an index value relative to the tire service life of the Conventional Example (defined as 100). A larger index value indicates a longer tire service life.

Tables 1 and 2 show the specifications of each shoulder lug groove and the evaluation results.

In Conventional Example, the maximum groove cross-sectional area of the shoulder lug groove 10 in the portion A having a constant groove cross-sectional area (distance L1=0.5×T, distance L2=0.8×T) was set to over 105%, specifically 107%, with respect to the average groove cross-sectional area. On the other hand, in Examples 1 and 3 to 7, the groove cross-sectional area of the shoulder lug groove 10 in the portion A (distance L1=0.5×T, distance L2=0.8×T) having a constant groove cross-sectional area was kept constant (the ratio of the groove cross-sectional area to the average groove cross-sectional area: from 95 to 105%), and the length of the portion having a constant groove cross-sectional area (described as "Length of portion of shoulder lug groove having constant cross-sectional area" in Table 1) was set to 0.3×T. In Example 2, the distance L1 and the distance L2 were set to 0.55×T and 0.75×T, respectively, the groove cross-sectional area of the shoulder lug groove 10 was kept constant (the ratio of the groove cross-sectional area to the average groove cross-sectional area: from 95 to 105%), and the length of the portion having a constant groove cross-sectional area was set to 0.2×T. In the Comparative Example, the distance L1 and the distance L2 were set to 0.6×T and 0.75×T, respectively, and the length of the portion having a constant groove cross-sectional area was set to 0.15×T.

TABLE 1

|  | Conventional Example | Example 1 | Example 2 | Comparative Example |
|---|---|---|---|---|
| Constant groove cross-sectional area | No | Constant | Constant | Constant |
| Change in groove wall angle? | No | No | No | No |
| Groove wall angle | 15 degrees | 15 degrees | 15 degrees | 15 degrees |
| Change in groove depth? | Yes | Yes | Yes | Yes |
| Minimum groove depth/Maximum groove depth | 0.75 | 0.8 | 0.8 | 0.8 |
| Length of portion of shoulder lug groove having constant cross-sectional area | 0.3 × T | 0.3 × T | 0.2 × T | 0.15 × T |
| Inclination angle of groove bottom inclined surface | 50 degrees | 15 degrees | 15 degrees | 15 degrees |
| Durability | 100 | 105 | 102 | 100 |
| Tire service life | 100 | 105 | 105 | 105 |

TABLE 2

|  | Example 3 | Example 4 | Example 5 | Example 6 | Example 7 |
|---|---|---|---|---|---|
| Constant groove cross-sectional area | Constant | Constant | Constant | Constant | Constant |
| Change in groove wall angle? | Yes | Yes | Yes | Yes | Yes |
| Groove wall angle | From 15 to 25 degrees | From 15 to 25 degrees | From 15 to 25 degrees | From 15 to 25 degrees | From 15 to 25 degrees |
| Change in groove depth? | No | Yes | Yes | Yes | Yes |
| Minimum groove depth/Maximum groove depth | 1.0 | 0.85 | 0.85 | 0.85 | 0.85 |
| Inclination angle of groove bottom inclined surface | 15 degrees | 15 degrees | 20 degrees | 30 degrees | 45 degrees |
| Durability | 102 | 110 | 118 | 125 | 114 |
| Tire service life | 130 | 110 | 111 | 112 | 112 |

From Conventional Example, Comparative Example, and Examples 1 to 4 in Tables 1 and 2, it is understood that durability can be improved while improving tire service life by changing at least one of the groove depth and the groove wall angle of the shoulder lug groove 10 to keep the groove cross-sectional area constant, and setting the length of the portion of the shoulder lug groove having the constant groove cross-sectional area to at least 0.2×T. Further, the degree of disturbance and corrugation of the carcass cords near the end of the belt portion 4 of Examples 1 to 7 was small compared to that in Conventional Example.

Further, as understood from Examples 4 to 7 in Table 1, when the inclination angle θ0 of the groove bottom inclined surface 10*a* of the shoulder lug groove 10 is from 20 to 45 degrees, durability improves.

The foregoing has been a detailed description of the pneumatic tire and the method of manufacturing a pneumatic tire according to the present technology. However, the pneumatic tire according to the present technology is not limited to the above embodiments or examples, and may be enhanced or modified in various ways within the scope of the present technology.

The invention claimed is:

1. A pneumatic tire comprising:
   a belt portion; and
   a tread portion provided with a plurality of shoulder lug grooves spaced apart in a tire circumferential direction, the plurality of shoulder lug grooves each extending outward in a tire lateral direction, opening to a ground contact end, comprising a closed end inward in the tire lateral direction, and the shoulder lug grooves extending linearly from the closed end outward in the tire lateral direction to open to the ground contact end,
   each of the plurality of shoulder lug grooves extending from a surface of the tread portion in a vertical direction with respect to the surface and comprising an inclined wall surface in each of groove walls of both sides of each of the plurality of shoulder lug grooves, the inclined wall surfaces each extending from the surface of the tread portion to a groove bottom side of the shoulder lug groove and as proceeding toward the groove bottom each approaching a side of a center of a groove width of the shoulder lug groove
   in a region of each of the plurality of shoulder lug groove from an end of a belt having a greatest width in the belt portion to an inner side in the tire lateral direction, each of the plurality of shoulder lug grooves having a groove width at the surface of the tread portion that decreases inward in the tire lateral direction, and comprising a portion where a groove cross-sectional area is kept constant at least by a decrease inward in the tire lateral direction of a groove wall angle with respect to the vertical direction of the inclined wall surfaces of the both sides of each of the plurality of shoulder lug grooves, the portion being provided in the tire lateral direction across a length of at least 20% of half a tire development width, and
   the portion where the groove cross-sectional area is kept constant having the groove cross-sectional area of from 97% to 103% with respect to an average groove cross-sectional area of the portion where the groove cross-sectional area is kept constant.

2. The pneumatic tire according to claim 1, wherein the groove wall angle of the portion changes within a range from 10 to 35 degrees.

3. The pneumatic tire according to claim 1, wherein a ratio of a minimum groove depth to a maximum groove depth in a region of each of the plurality of shoulder lug grooves from a position separated from a tire centerline of the pneumatic tire by one-fourth of the tire development width to the ground contact end is 0.8 or greater.

4. The pneumatic tire according to claim 3, wherein
   the ratio is from 0.85 to 0.95; and
   the groove wall angle in the portion changes within a range from 15 to 25 degrees in the portion.

5. The pneumatic tire according to claim 1, wherein
   the shoulder lug groove comprises a groove bottom inclined surface inclined such that a groove depth of each of the plurality of shoulder lug grooves gradually decreases as approaching closer to the closed end; and
   the groove bottom inclined surface has, in a profile cross section of the pneumatic tire along a tire radial direction, an inclination angle with respect to a normal line of a surface of the tread portion ranging from 20 to 45 degrees, at the closed end.

6. The pneumatic tire according to claim 1, wherein
   the portion where the groove cross-sectional area is kept constant is from a position separated from a tire centerline of the pneumatic tire by a distance L1 to a position separated from the tire centerline by a distance L2;
   L1 is a distance equivalent to from 40 to 60% of half of the tire development width; and
   L2 is a distance equivalent to from 70 to 90% of half of the tire development width.

7. The pneumatic tire according to claim 1, wherein the portion where the groove cross-sectional area is kept constant has a length in the tire lateral direction of no greater than 35% of half of the tire development width.

8. The pneumatic tire according to claim 1, wherein a groove depth of each of the plurality of shoulder lug grooves changes in the portion where the groove cross-sectional area is kept constant.

9. The pneumatic tire according to claim 2, wherein a ratio of a minimum groove depth to a maximum groove depth in a region of each of the plurality of shoulder lug grooves from a position separated from a tire centerline of the pneumatic tire by one-fourth of the tire development width to the ground contact end is 0.8 or greater.

10. The pneumatic tire according to claim 9, wherein
    the ratio is from 0.85 to 0.95; and
    the groove wall angle in the portion changes within a range from 15 to 25 degrees in the portion.

11. The pneumatic tire according to claim 10, wherein
    the shoulder lug groove comprises a groove bottom inclined surface inclined such that a groove depth of each of the plurality of shoulder lug grooves gradually decreases as approaching closer to the closed end; and
    the groove bottom inclined surface has, in a profile cross section of the pneumatic tire along a tire radial direction, an inclination angle with respect to a normal line of a surface of the tread portion ranging from 20 to 45 degrees, at the closed end.

12. The pneumatic tire according to claim 11, wherein
    the portion where the groove cross-sectional area is kept constant is from a position separated from the tire centerline of the pneumatic tire by a distance L1 to a position separated from the tire centerline by a distance L2;
    L1 is a distance equivalent to from 40 to 60% of half of the tire development width; and
    L2 is a distance equivalent to from 70 to 90% of half of the tire development width.

13. The pneumatic tire according to claim 12, wherein the portion where the groove cross-sectional area is kept constant has a length in the tire lateral direction of no greater than 35% of half of the tire development width.

14. A method of manufacturing a pneumatic tire, the method comprising the steps of:

molding an unvulcanized green tire that comprises a belt portion; and enclosing and heating the green tire in a mold;

the mold comprising a plurality of protrusion portions for forming shoulder lug grooves that extend linearly in one direction such that a plurality of shoulder lug grooves, each extending outward in a tire lateral direction, opening to a ground contact end, comprising a closed end inward in a tire lateral direction, are provided spaced apart in a tire circumferential direction in a tread portion of the pneumatic tire, and the shoulder lug grooves extending linearly from the closed end outward in the tire lateral direction to open to the ground contact end, each of the plurality of protrusion portions extending from a mold surface corresponding to the tread surface in a vertical direction with respect to the mold surface and comprising an inclined wall surface in each of side walls of both sides of each of the plurality of protrusion portions corresponding to a groove wall of the shoulder lug groove, the inclined wall surfaces as proceeding toward a protruded side each approaching a center side of a protrusion width of the protrusion portion, in a region of each of the plurality of protrusion portions from an end of a belt having a greatest width in the belt portion of the green tire to an inner side in the tire lateral direction, each of the plurality of protrusion portions having a width at a base portion of the protrusion portion that decreases inward in the tire lateral direction, and comprising a portion where a cross-sectional area of each of the plurality of protrusion portions is kept constant at least by a decrease inward in the tire lateral direction in a wall inclination angle with respect to the vertical direction of the side walls of the both sides of each of the plurality of protrusion portions corresponding to a groove wall of the shoulder lug groove, the portion being provided in the tire lateral direction across a length of at least 20% of half a tire development width, and the portion where the cross-sectional area of each of the plurality of protrusion portions is kept constant having the cross-sectional area of from 97% to 103% with respect to an average protrusion cross-sectional area of the portion where the cross-sectional area of each of the plurality of protrusion portions is kept constant.

15. The method of manufacturing a pneumatic tire according to claim 14, wherein the mold comprises two partial molds for forming a tread pattern in the tread portion of the green tire, each of the partial molds comprising the plurality of protrusion portions; and each of the plurality of protrusion portions is forced into the tread portion of the green tire from an outer side toward an inner side in the tire lateral direction when the mold encloses the green tire.

16. The method of manufacturing a pneumatic tire according to claim 14, wherein a protrusion height of each of the plurality of protrusion portions changes in the portion where the cross-sectional area is kept constant.

17. A pneumatic tire comprising:

a belt portion; and a tread portion provided with a plurality of shoulder lug grooves spaced apart in a tire circumferential direction, the plurality of shoulder lug grooves each extending outward in a tire lateral direction, opening to a ground contact end, comprising a closed end inward in the tire lateral direction, and the shoulder lug grooves extending linearly from the closed end outward in the tire lateral direction to open to the ground contact end, each of the plurality of shoulder lug grooves extending from a surface of the tread portion in a vertical direction with respect to the surface and comprising an inclined wall surface in each of groove walls of both sides of each of the plurality of shoulder lug grooves, the inclined wall surfaces each extending from the surface of the tread portion to a groove bottom side of the shoulder lug groove and as proceeding toward the groove bottom each approaching a side of a center of a groove width of the shoulder lug groove, in a region of each of the plurality of shoulder lug groove from an end of a belt having a greatest width in the belt portion to an inner side in the tire lateral direction, each of the plurality of shoulder lug grooves having a groove width at the surface of the tread portion that decreases inward in the tire lateral direction, and comprising a portion where a groove cross-sectional area is kept constant at least by a change in a groove depth of each of the plurality of shoulder lug grooves, the portion being provided in the tire lateral direction across a length of at least 20% of half a tire development width, and the portion where the groove cross-sectional area is kept constant having the groove cross-sectional area of from 97% to 103% with respect to an average groove cross-sectional area of the portion where the groove cross-sectional area is kept constant.

* * * * *